(12) United States Patent
Labrousse et al.

(10) Patent No.: US 7,737,080 B2
(45) Date of Patent: Jun. 15, 2010

(54) SUBSTRATE, IN PARTICULAR GLASS SUBSTRATE, SUPPORTING AT LEAST ONE STACK OF A PHOTOCATALYTIC LAYER AND A SUBLAYER FOR THE HETEROEPITAXIAL GROWTH OF SAID LAYER

(75) Inventors: Laurent Labrousse, Saint Prim (FR); Nicolas Nadaud, Gentilly (FR)

(73) Assignee: Saint-Gobain Glass France, Courbevoie (FR)

( * ) Notice: Subject to any disclaimer, the term of this patent is extended or adjusted under 35 U.S.C. 154(b) by 628 days.

(21) Appl. No.: 10/576,724

(22) PCT Filed: Oct. 22, 2004

(86) PCT No.: PCT/FR2004/050532

§ 371 (c)(1),
(2), (4) Date: Dec. 13, 2006

(87) PCT Pub. No.: WO2005/040058

PCT Pub. Date: May 6, 2005

(65) Prior Publication Data

US 2007/0129248 A1 Jun. 7, 2007

(30) Foreign Application Priority Data

Oct. 23, 2003 (FR) ................................. 03 50729

(51) Int. Cl.
*B01J 21/06* (2006.01)
*B01J 23/02* (2006.01)
*C23C 16/40* (2006.01)

(52) U.S. Cl. .................. 502/350; 502/308; 502/309; 502/527.12; 427/255.19; 427/255.21; 427/255.31; 427/255.36

(58) Field of Classification Search ............... 502/308, 502/309; 427/255.19, 255.21, 255.31, 255.36
See application file for complete search history.

(56) References Cited

U.S. PATENT DOCUMENTS

| 5,225,031 | A * | 7/1993 | McKee et al. ............... 428/471 |
| 6,465,042 | B2 * | 10/2002 | Saitoh et al. ............ 427/255.19 |
| 6,576,344 | B1 * | 6/2003 | Doushita et al. ............ 428/426 |
| 6,875,319 | B2 | 4/2005 | Nadaud et al. |
| 7,005,188 | B2 | 2/2006 | Anderson et al. |
| 2002/0045073 | A1 | 4/2002 | Finley |
| 2004/0241406 | A1 | 12/2004 | Nadaud et al. |
| 2005/0123772 | A1 | 6/2005 | Coustet et al. |

FOREIGN PATENT DOCUMENTS

WO 03/009061 1/2003

OTHER PUBLICATIONS

Wenjie Zhang, Ying Li, Shenglong Zhu, Fuhui Wang, "Surface modification of TiO2 film by iron doping using reactive magnetron sputtering" Chemical Physics Letters 373 (2003), pp. 333-337.*
S.K. Zheng, T.M. Wang, C. Wang, G. Xiang, "Photocatalytic activity study of TiO2 thin films with and without Fe ion implantation" Nuclear Instruments and Methods in Physics Research B 187 (2002), pp. 479-484.*
P. Zeman, S. Takabayashi, "Nano-scaled photocatalytic TiO2 thin films prepared by magnetron sputtering" Thin Solid Films 433 (2003), pp. 57-62.*
Chambers, et al. "Epitaxial growth and properties of ferromagnetic co-doped TiO2 anatase" Applied Physics Letters vol. 79, No. 21 (2001), pp. 3467-3469.*
U.S. Appl. No. 10/577,049, filed Apr. 24, 2006, Labrousse, et al.
U.S. Appl. No. 10/568,390, filed Feb. 15, 2006, Labrousse, et al.
U.S. Appl. No. 10/565,001, filed Jan. 19, 2006, Labrousse, et al.
U.S. Appl. No. 10/581,056, filed May 30, 2006, Fleury, et al.
U.S. Appl. No. 10/567,901, filed Feb. 10, 2006, Fleury, et al.
U.S. Appl. No. 10/562,222, filed Dec. 23, 2005, Schicht, et al.
U.S. Appl. No. 11/097,831, filed Apr. 4, 2005, Nadaud, et al.
U.S. Appl. No. 10/519,098, filed Jan. 20, 2006, Fleury, et al.
Takahashi, T.et al.,"Photocatalytic Properties of TiO2/WO3 bilayers deposited by reactive sputtering", Journal of Vacuum Science and Technology, vol. 21, No. 4, pp. 1409-1413, 2003.
Okudera, H. et al., "Fabrication of silica-anatase multilayer coating on a K-CA-Zn-Si glass substrate", Thin Solid Films, vol. 441, pp. 50-55, 2003.

* cited by examiner

*Primary Examiner*—Ngoc-Yen M Nguyen
*Assistant Examiner*—Diana J Liao
(74) *Attorney, Agent, or Firm*—Oblon, Spivak, McClelland, Maier & Neustadt, L.L.P.

(57) ABSTRACT

The invention relates to a structure, comprising a substrate supporting a layer with a photocatalytic and anti-soiling property on at least part of the surface thereof, said layer being based on titanium dioxide ($TiO_2$) which is at least partially crystallized in the anatase form thereof. Said structure is characterised in comprising a sublayer (SC) directly under at least one $TiO_2$ layer, said sublayer having a crystallographic structure which provides assistance to crystallization by heteroepitaxial growth in the anatase form of the $TiO_2$-based upper layer, the photocatalytic property being obtained without any heating step.

14 Claims, No Drawings

SUBSTRATE, IN PARTICULAR GLASS SUBSTRATE, SUPPORTING AT LEAST ONE STACK OF A PHOTOCATALYTIC LAYER AND A SUBLAYER FOR THE HETEROEPITAXIAL GROWTH OF SAID LAYER

The present invention relates to substrates, such as glass, glass-ceramic or plastic substrates, which have been provided with a photocatalytic coating in order to give them what is called an "antisoiling or self-cleaning" function.

One important application of these substrates relates to glazing, which may be applied in very many different situations—from utilitarian glazing to glazing used in domestic electrical appliances, from automotive glazing to architectural glazing.

It also applies to reflective glazing of the mirror type (domestic mirrors or driving mirrors) and to opacified glazing of the lightened type.

Similarly, the invention also applies to nontransparent substrates, such as ceramic substrates or any other substrate that may in particular be used as architectural material (metal, tiling, etc.). Preferably, it applies, irrespective of the nature of the substrate, to substantially flat or slightly curved substrates.

Photocatalytic coatings have already been studied, especially those based on titanium oxide crystallized in anatase form. Their capability of degrading soil of organic origin or microorganisms through the action of UV radiation is very beneficial. They also often have a hydrophilic character, allowing mineral soil to be removed by spraying it with water or, in the case of outdoor glazing, by rain.

This type of coating exhibiting antisoiling, bactericidal or algicidal properties has already been described, for example in Patent WO 97/10186, which describes several embodiments thereof.

To exert its antisoiling function (hydrophilicity and destruction of organic contaminating chains), the $TiO_2$ must be at least partly crystallized in the anatase structure. Otherwise $TiO_2$ is not functional and requires a heat treatment after deposition, so as to acquire the crystallographic structure that makes it effective.

Thus, if the $TiO_2$ is deposited by a chemical vapor deposition (CVD) technique involving a high temperature, it has the correct structure spontaneously. If it is deposited cold (at room temperature), especially by a vacuum deposition technique, it becomes functional only after a suitable heat treatment.

The object of the present invention is to propose a solution for obtaining the correct state of $TiO_2$ without employing a heating step. However, such a heating step (toughening or annealing operation), envisaged in certain cases such as for safety applications or applications in which the surface of the glass has to be hardened, is not excluded.

For this purpose, the present application proposes the deposition, just before deposition of the $TiO_2$ layer, of an underlayer that will provide an appropriate base for correct growth of the $TiO_2$ layer (heteroepitaxial growth), this underlayer being advantageously deposited at room temperature and without requiring the substrate to be heated either.

International Application WO 02/40417 describes the deposition of a $ZrO_2$ underlayer followed by $TiO_2$ under very many possible conditions, with the need for heating, without the preferential formation of anatase being demonstrated, the rutile form also being favored.

The first subject of the invention is therefore a structure comprising a substrate bearing, on at least part of its surface, an antisoiling layer having a photocatalytic property, based on titanium dioxide ($TiO_2$) at least partly crystallized in its anatase form, characterized in that it includes, immediately beneath at least one $TiO_2$ layer, an underlayer (UL) having a crystallographic structure that has assisted in the crystallization, by heteroepitaxial growth in the anatase form, of the $TiO_2$-based upper layer, the photocatalytic property having been acquired without any heating step.

The underlayer (UL) is in particular based on a compound crystallized in a cubic or tetragonal system and having a lattice cell dimension equal to that of $TiO_2$ crystallized in anatase form to within ±8%, especially to within ±6%.

Preferably, the underlayer (UL) consists of $ATiO_3$, A denoting barium or strontium.

The thickness of the underlayer (UL) is not critical. For example, thickness values of between 10 and 100 nm may be mentioned.

The substrate consists, for example, of a sheet, whether plane or with curved faces, of monolithic or laminated glass, glass-ceramic or a hard thermoplastic, such as polycarbonate, or else consists of glass or glass-ceramic fibers, said sheets or said fibers having, where appropriate, received at least one other functional layer before application of the underlayer (UL) (in the case of more than one layer, this may also be referred to as a multilayer stack).

The applications of the sheets were mentioned above. As regards the application of the fibers, mention may be made of air or water filtration, and also bactericidal applications.

If the substrate is made of glass or glass-ceramic, at least one functional layer subjacent to the underlayer (UL) may be a layer forming a barrier to the migration of alkali metals from the glass or glass-ceramic. Such migration is liable to result from the application of temperatures in excess of 600° C. Such layers forming a barrier to alkali metals are known, and mention may be made of $SiO_2$, SiOC and $SiO_xN_y$ layers, with a thickness for example of at least 50 nm, as described in PCT International Application WO 02/24971.

At least one functional layer subjacent to the underlayer (UL) may be a layer having an optical functionality (advantageously for adjusting the optics in reflection), a thermal control layer or a conducting layer.

The layers having an optical functionality are especially antireflection layers, light radiation filtration layers, coloration layers, scattering layers, etc. Mention may be made of layers consisting of $SiO_2$, $Si_3N_4$, amorphous $TiO_2$, photocatalytic crystallized $TiO_2$, $SnO_2$, ZnO.

The thermal control layers are especially solar control layers or what are called low-e (low-emissivity) layers.

The conducting layers are especially heating layers, antenna layers or antistatic layers, and arrays of conducting wires may be included among these layers.

To give an example, mention may be made of glass or glass-ceramic substrates, especially of the sheet type, that have received a layer acting as a barrier to the migration of alkali metals from the glass or glass-ceramic, followed by a monolayer, bilayer or trilayer having an optical functionality.

The $TiO_2$ base layer consists of $TiO_2$ alone or of $TiO_2$ doped with at least one dopant chosen in particular from: N; pentavalent cations such as Nb, Ta and V; Fe; and Zr.

According to advantageous features of the present invention:

the $TiO_2$ layer has been deposited at room temperature by vacuum sputtering, where appropriate magnetron and/or ion-beam sputtering;

the underlayer (UL) has been deposited at room temperature by vacuum sputtering, where appropriate magnetron and/or ion-beam sputtering;

ATiO$_3$ has been deposited at room temperature by vacuum sputtering, where appropriate magnetron and/or ion-beam sputtering, using ceramic targets chosen from ATiO$_3$, ATiO$_{3-x}$ where $0<x\leq 3$, and ATi, the supply being a radiofrequency supply and the atmosphere in the sputtering chamber containing only argon when ATiO$_3$ is used as target, the supply being a DC or AC supply and the reactive atmosphere in the sputtering chamber containing oxygen and argon when ATi or ATiO$_{3-x}$ is used as target, the TiO$_2$ layer having been deposited in a following step in the same sputtering chamber.

The TiO$_2$ layer may be coated with at least one overlayer of a material that does not disturb the antisoiling function of the TiO$_2$ layer, such as SiO$_2$.

The layers intended to be in contact with the atmosphere in the finished structure are, depending on the case, hydrophilic layers or hydrophobic layers.

The subject of the present invention is also the application of ATiO$_3$ to the formation of a layer for assisting in the crystallization, in the anatase form by heteroepitaxial growth, of an optionally doped ATiO$_2$-based upper layer, A denoting barium or strontium.

The subject of the present invention is also a process for producing a structure as defined above, characterized in that an ATiO$_3$ underlayer, A denoting barium or strontium, is deposited on a substrate made of glass or glass-ceramic or hard polycarbonate-type plastic, of the sheet type, or on glass or glass-ceramic fibers, followed by an optionally doped TiO$_2$ layer, at least one overlayer of a material not disturbing the antisoiling function of the TiO$_2$ layer then possibly being deposited where appropriate on this TiO$_2$ layer.

The ATiO$_3$ underlayer (UL) and the TiO$_2$ layer may be deposited in succession at room temperature by vacuum sputtering, where appropriate magnetron and/or ion-beam sputtering, in the same chamber, the targets used for depositing said underlayer being chosen from ATiO$_3$, ATiO$_{3-x}$, where $0<x\leq 3$, and ATi, the supply being a radiofrequency supply and the atmosphere in the sputtering chamber containing only argon when ATiO$_3$ is used as target, the supply being a DC or AC supply and the reactive atmosphere in the sputtering chamber containing oxygen and argon when ATi or ATiO$_{3-x}$ is used as target; and the target used for depositing the TiO$_2$ being Ti or TiO$_x$, where $0<x<2$.

If the ATiO$_3$ is deposited by vacuum sputtering, the pressure may be between $10^{-1}$ and 2.5 Pa.

If the TiO$_2$ is deposited by sputtering, where appropriate magnetron and/or ion-beam sputtering, the supply is generally a DC or AC supply and the pressure is advantageously about 1-3 Pa.

According to the present invention, it is possible for a heat treatment step not to be carried out after the TiO$_2$ layer and, where appropriate, the overlayer(s) have been deposited.

If the coating of a glass or glass-ceramic substrate is carried out, it is possible, before the underlayer (UL) has been applied, to deposit at least one layer forming a barrier to the migration of alkali metals present in the glass or glass-ceramic to be deposited on the substrate, an annealing or toughening operation then possibly being carried out, after the TiO$_2$ layer and, where appropriate, the overlayer(s) have been deposited, at a temperature of between 250° C. and 550° C., preferably between 350° C. and 500° C. in the annealing operation, and at a temperature of at least 600° C. in the case of the toughening operation.

The toughening or annealing operations may be carried out in cases where it will be desirable to improve the activity of the TiO$_2$ layer.

The possible constituents of the above barrier layers have been described above. Such layers may be deposited by sputtering, where appropriate magnetron sputtering, using known targets, (for example Al:Si in the case of an aluminum-doped SiO$_2$ layer), advantageously in pulsed mode, whether AC or DC, at a pressure of $10^{-1}$ to 1 Pa and in gaseous argon/oxygen.

Before the ATiO$_3$ underlayer (UL) has been applied, at least one functional layer chosen from layers having an optical functionality, thermal control layers and conducting layers may also be deposited, said functional layers being advantageously deposited by vacuum sputtering, where appropriate magnetron and/or ion-beam sputtering.

The subject of the present invention is also single or multiple glazing comprising, respectively, one or more than one structure as defined above, both the TiO$_2$-based antisoiling layer and its associated underlayer (UL) being present on at least one of its external faces, the faces not having the TiO$_2$-based antisoiling layer and its associated underlayer possibly including at least one other functional layer. These layers may be chosen from those described above.

Such glazing is applicable as "self-cleaning" glazing, especially antifogging, anticondensation and antisoiling glazing, especially as architectural glazing of the double-glazing type, automotive glazing of the windshield, rear window and side windows of automobiles, driving mirrors, glazing for trains, airplanes and ships, utilitarian glazing, such as glass for aquariums, shop windows, greenhouses, interior furnishing, urban furniture (bus shelters, advertising panels, etc.), mirrors, screens for display systems of the computing, television or telephone type, electrically controllable glazing, such as electrochromic or liquid-crystal glazing, electroluminescent glazing and photovoltaic glazing.

The following examples illustrate the present invention without however limiting its scope.

EXAMPLE 1 (ACCORDING TO THE INVENTION)

Glass/SiO$_2$/BaTiO$_3$/TiO$_2$ Stack

The following successive layers were deposited on a glass sheet 4 mm in thickness:

an SiO$_2$ layer 150 nm in thickness;

a BaTiO$_3$ layer 10 nm in thickness; and a TiO$_2$ layer 100 nm in thickness.

The above three layers, SiO$_2$, BaTiO$_3$ and TiO$_2$, were deposited by magnetron sputtering under the following respective conditions:

SiO$_2$ layer using an Al:Si target, with a supply in pulsed mode (change-of-polarity frequency: 30 kHz) at a pressure of $2\times 10^{-3}$ mbar (0.2 Pa), a power of 2000 W and 15 sccm of Ar and 15 sccm of O$_2$;

BaTiO$_3$ layer using a BaTiO$_3$ target, with a radiofrequency supply, at a pressure of $4.4\times 10^{-3}$ mbar (0.44 Pa), a power of 350 W and 50 sccm of argon; and TiO$_2$ layer deposited using a TiO$_x$, target with a DC supply, at a pressure of 24×10$^{-3}$ mbar (2.4 Pa), a power of 2000 W, 200 sccm of Ar and 2 sccm of O$_2$

EXAMPLE 2 (ACCORDING TO THE INVENTION)

The same stack as in Example 1 was produced, except that the BaTiO$_3$ layer had a thickness of 20 nm.

EXAMPLE 3 (COMPARATIVE EXAMPLE)

Glass/SiO$_2$/TiO$_2$ Stack

The stack above was produced under the same conditions as in Example 1, except that the BaTiO$_3$ layer was not deposited.

EXAMPLE 4

Evaluation of the Photocatalytic Activity

The photocatalytic activity of the TiO$_2$ layer of each of the stacks of Examples 1 to 3, and also of the TiO$_2$ layer of a stack sold by Saint-Gobain Glass France under the trademark "Bioclean™", was evaluated, the evaluation having been performed without annealing and after annealing carried out under the following conditions: rise from room temperature to 500° C. at a rate of 5° C./min; 2 hours at 500° C.; natural cooling.

The evaluation test was the stearic acid photodegradation test followed by infrared transmission, described in PCT International Application WO 00/75087.

The results are given in Table I.

TABLE I

| Stack | SAT* without annealing (×10$^{-3}$cm$^{-1}$ · min$^{-1}$) | SAT* after annealing (×10$^{-3}$cm$^{-1}$ · min$^{-1}$) |
| --- | --- | --- |
| Example 1 (invention) | 9.7 | 40 |
| Example 2 (invention) | 9.2 | 32 |
| Example 3 (comparative) | 1.2 | 35 |

*Stearic acid test.

The invention claimed is:

1. A structure, comprising:
a substrate; and
an antisoiling layer having a photocatalytic property formed on at least part of a surface of the substrate; wherein:
the antisoiling layer comprises a titanium dioxide-based layer and an underlayer (UL) immediately beneath the titanium dioxide-based layer;
the titanium dioxide-based layer comprises titanium dioxide at least partly crystallized in anatase form;
the underlayer (UL) has a crystallographic structure that assisted in crystallization of the titanium dioxide, by heteroepitaxial growth in the anatase form, of the titanium dioxide-based layer; and
the photocatalytic property is obtained without performing a heating step.

2. The structure as claimed in claim 1, wherein the underlayer (UL) comprises a compound crystallized in a cubic or tetragonal system and having a lattice cell dimension equal to that of TiO$_2$ crystallized in anatase form to within ±8%.

3. The structure as claimed in claim 1, wherein the underlayer (UL) consists of ATiO$_3$, A denoting barium or strontium.

4. The structure as claimed in claim 1, wherein the underlayer (UL) has a thickness of between 10 and 100 nm.

5. The structure as claimed in claim 1, wherein:
the substrate is in a form selected from the group consisting of a sheet having planar or curved faces, monolithic or laminated glass, glass-ceramic or hard thermoplastic, and glass or glass-ceramic fibers; and
a functional layer is optionally provided on the substrate beneath the underlayer (UL).

6. The structure as claimed in claim 5, wherein:
the substrate comprises glass or glass-ceramic; and
at least one functional layer is provided on the substrate beneath the underlayer (UL) as a barrier to migration of alkali metals from the glass or glass-ceramic.

7. The structure as claimed in claim 5, wherein at least one functional layer is provided on the substrate beneath the underlayer (UL), the at least one functional layer comprising a layer having an optical functionality, a thermal control layer or a conducting layer.

8. The structure as claimed in claim 5, wherein:
the substrate comprises glass or glass-ceramic; and
a layer acting as a barrier to the migration of alkali metals from the glass or glass-ceramic and a monolayer, bilayer or trilayer having an optical functionality are formed on the substrate.

9. The structure as claimed in claim 1, wherein the titanium dioxide-based layer consists of TiO$_2$ alone or of TiO$_2$ doped with at least one dopant selected from the group consisting of N, pentavalent cations, Fe and Zr.

10. The structure as claimed in claim 1, wherein the titanium dioxide-based layer is formed by deposition at room temperature by a technique selected from the group consisting of vacuum sputtering, magnetron sputtering and ion-beam sputtering.

11. The structure as claimed in claim 1, wherein the underlayer (UL) is formed by deposition at room temperature by a technique selected from the group consisting of vacuum sputtering, magnetron sputtering and ion-beam sputtering.

12. The structure as claimed in claim 3, wherein:
ATiO$_3$ is deposited at room temperature by a technique selected from the group consisting of vacuum sputtering, magnetron sputtering and ion-beam sputtering, using ceramic targets comprising at least one member selected from the group consisting of ATiO$_3$, ATiO$_{3-x}$, wherein 0<x<3, and ATi;
deposition is carried out using a radiofrequency supply and an atmosphere of argon only when ATiO$_3$ is used as target, or using a DC or AC supply and an atmosphere of oxygen and argon when ATi or ATiO$_{3-x}$ is used as target;
the titanium dioxide-based layer is deposited after the underlayer (UL) in the same sputtering chamber.

13. The structure as claimed in claim 1, wherein:
the structure comprises at least one overlayer formed over the titanium dioxide-based layer; and
the overlayer comprises a material that does not disturb the antisoiling function of the titanium dioxide-based layer.

14. A single or multiple glazing, comprising the structure of claim 1, wherein:
the antisoiling layer and the underlayer (UL) are present at an external face of the glazing; and
a face of the glazing not provided with the antisoiling layer and the underlayer (UL) optionally comprises at least one additional functional layer.

* * * * *